(12) United States Patent
Blackmore et al.

(10) Patent No.: US 7,539,989 B2
(45) Date of Patent: *May 26, 2009

(54) FACILITATING INTRA-NODE DATA TRANSFER IN COLLECTIVE COMMUNICATIONS

(75) Inventors: Robert S. Blackmore, Poughkeepsie, NY (US); Bin Jia, Poughkeepsie, NY (US); Richard R. Treumann, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 322 days.

This patent is subject to a terminal disclaimer.

(21) Appl. No.: 10/962,721

(22) Filed: Oct. 12, 2004

(65) Prior Publication Data

US 2006/0080668 A1   Apr. 13, 2006

(51) Int. Cl.
  *G06F 9/46*   (2006.01)
(52) U.S. Cl. .................................................. 718/100
(58) Field of Classification Search ................. 709/232, 709/229, 213; 711/170; 719/310; 718/100
  See application file for complete search history.

(56) References Cited

U.S. PATENT DOCUMENTS

| | | | |
|---|---|---|---|
| 5,617,537 A * | 4/1997 | Yamada et al. | 709/214 |
| 6,035,335 A | 3/2000 | Franke et al. | 709/232 |
| 6,038,604 A | 3/2000 | Bender et al. | 709/233 |
| 6,260,068 B1 | 7/2001 | Zalewski et al. | 709/226 |
| 6,334,138 B1 | 12/2001 | Kureya | 709/201 |
| 6,601,089 B1 | 7/2003 | Sistare et al. | 709/213 |
| 6,601,146 B2 * | 7/2003 | Auslander et al. | 711/147 |
| 6,647,423 B2 | 11/2003 | Regnier et al. | 709/229 |
| 6,681,239 B1 | 1/2004 | Munroe et al. | 709/104 |
| 6,886,165 B1 * | 4/2005 | Muller et al. | 719/310 |
| 7,124,211 B2 * | 10/2006 | Dickson et al. | 710/22 |
| 2002/0099919 A1 | 7/2002 | Normant et al. | 711/170 |
| 2004/0107419 A1 | 6/2004 | Blackmore et al. | 718/100 |

OTHER PUBLICATIONS

"Coupling DSM-based Parallel Applications," Yvon Jegou, Inria, ISSN 0249-6339, pp. 1-19.
"Message Proxies for Efficient, Protected Communication on SMP Clusters," Beng-Hong Lim, Philip Heidelberger, Pratap Pattnaik and Marc Snir, IBM T.J. Watson Research Center, 12 pages.

* cited by examiner

*Primary Examiner*—Van H Nguyen
*Assistant Examiner*—Eric C Wai
(74) *Attorney, Agent, or Firm*—Geraldine Monteleone, Esq.; Kevin P. Radigan, Esq.; Heslin Rothenberg Farley & Mesiti P.C.

(57) ABSTRACT

Intra-node data transfer in collective communications is facilitated. A memory object of one task of a collective communication is concurrently attached to the address spaces of a plurality of other tasks of the communication. Those tasks that attach the memory object can access the memory object as if it was their own. Data can be directly written into or read from an application data structure of the memory object by the attaching tasks without copying the data to/from shared memory.

17 Claims, 13 Drawing Sheets

FACILITATING INTRA-NODE DATA TRANSFER IN COLLECTIVE COMMUNICATIONS

CROSS-REFERENCE TO RELATED APPLICATIONS

This application contains subject matter which is related to the subject matter of the following applications, each of which is assigned to the same assignee as this application. Each of the below listed applications is hereby incorporated herein by reference in its entirety:

"Efficient Shared Memory Transport In A Distributed Data Processing Environment," Blackmore et al., Patent Application Publication No. US 2004/0107419 A1, published Jun. 3, 2004; and "Data Gather Scatter—Redistribution Machine," Jia et al., Ser. No. 10/963,091, filed herewith, Patent Application Publication No. US 20050060714, published Mar. 17, 2005.

TECHNICAL FIELD

This invention relates, in general, to data transfer in communications environments, and, in particular, to intra-node data transfer in collective communications.

BACKGROUND OF THE INVENTION

Data transfer can be performed via a number of mechanisms, including using a network interface to transfer the data or using shared memory. Transferring data via shared memory, when an option, often provides improved performance for parallel applications of distributed computing systems, as compared to the transferring of data via network interfaces. Different types of communications can benefit from shared memory data transfer, including individual communications and collective communications.

As one example, to transfer data between tasks of a collective communication, via shared memory, a shared memory buffer is statically attached by all participating tasks of the communication and data is copied into the shared memory buffer by one or more source tasks and then copied out from the buffer by one or more destination tasks. This type of shared memory data transfer requires two copies: one copy from the one or more source tasks to the shared buffer, and then another copy from the shared buffer to the one or more destination tasks. This has negative performance implications, especially for large messages in which there may be multiple portions of the messages being copied twice.

Based on the foregoing, a need exists for an enhanced capability to transfer data for collective communications. In particular, a need exists for a capability that minimizes the copying of data during a data transfer.

SUMMARY OF THE INVENTION

The shortcomings of the prior art are overcome and additional advantages are provided through the provision of a method of sharing data between tasks of a communications environment. The method includes, for instance, coupling a set of data source tasks with a set of data sink tasks, wherein at least one of the set of data source tasks and the set of data sink tasks includes a plurality of tasks; and providing data from the set of data source tasks to the set of data sink tasks absent a copying of the data to/from shared memory.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability of sharing data between tasks of a communications environment is provided. The sharing capability enables tasks of a collective communication to transfer data between one another without copying data to/from shared memory. Instead, at least a portion of memory of a task of the collective communication is made concurrently addressable by multiple other tasks of the communication, such that data may be transferred directly between the tasks without copying the data to/from the shared memory.

A collective communication enables the exchange of data among a group of processes or tasks. Collective communications are used in various message transport protocols, including the Message Passing Interface (MPI) protocol. Examples of collective communications used in the Message Passing Interface include, for instance, broadcast, gather, scatter and reduce, among others. These communications and MPI are described in various publications including, for instance, an IBM® publication entitled "RS/6000 SP: Practical MPI Programming," Yukiya Aoyama and Jun Nakano, IBM Publication SG24-5380-00 (August 1999); and in "MPI—The Complete Reference," by Marc Snir, Steve Otto, Steven Huss-Lederman, David Walker, Jack Dongarra; Vol. 1—The MPI Core—ISBN 0-262-69215-5 and Vol. 2—The MPI-2 Extensions—ISBN 0-262-69216-3; The MIT Press, Cambridge Mass, London England, September 1998, each of which is hereby incorporated herein by reference in its entirety. (IBM® is a registered trademark of International Business Machines Corporation, Armonk, N.Y., USA. Other names used herein may be registered trademarks, trademarks, or product names of International Business Machines Corporation or other companies.)

Previously, to transfer data in a collective communication, one or more tasks of the communication forward data to one or more other tasks by copying the data to/from shared memory. In particular, a shared memory region is statically allocated and the participating tasks attach the shared memory region to their address spaces. A portion of the shared memory region is used as a buffer to stage data transfers and another portion is used as a control structure for exchanging control information among the tasks. The staged data transfer is by copy_in and copy_out. This is described in further detail with reference to FIG. 1.

Figure 1:
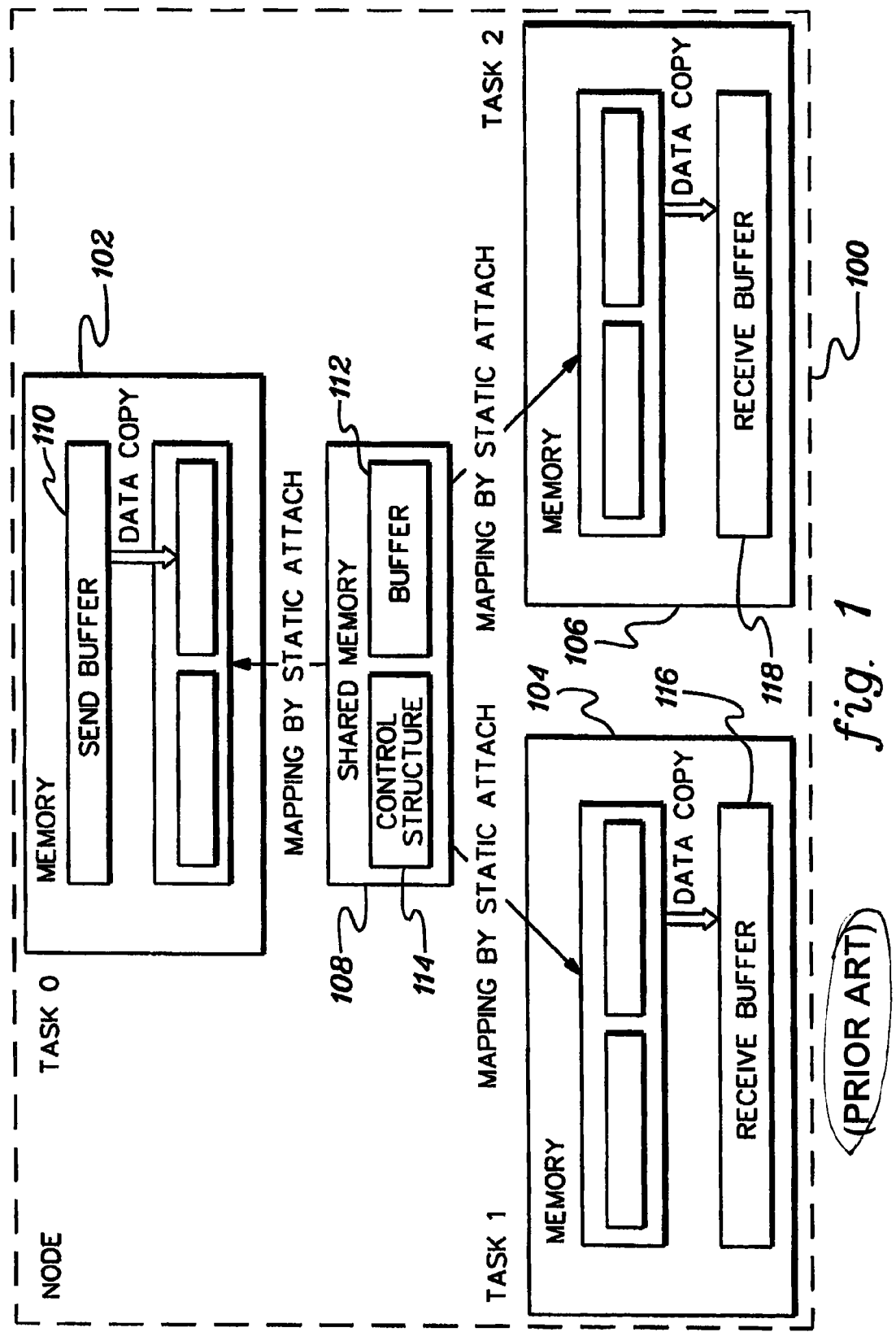
FIG. 1 depicts one example of data being transferred between tasks of a collective communication by copying the data to/from a statically attached shared memory.

With reference to FIG. 1, the static shared memory approach is described as it relates to an MPI_Bcast (Broadcast) function on an AIX platform. There are three tasks, including Task 0, Task 1 and Task 2, of an application executing on a single node 100 of a communications environment. In one example, the node is an RS/6000 running AIX, offered by International Business Machines Corporation, Armonk, N.Y. Each of the three tasks has its own address space 102, 104, 106, respectively, and the three tasks communicate by copying data in and out of a shared memory region 108. Since this is a broadcast function, one of the tasks, e.g., Task 0, is the root task that is transferring data to the other tasks, e.g., Tasks 1 and 2.

During initialization of the application, each of the three tasks statically attach shared memory region 108 to its own address space. For instance, Task 0 statically attaches shared memory region 108 to its address space 102 via shmget/shmatt system calls provided with the operating system. Similarly, Task 1 uses the system calls to statically attach shared memory region 108 to address space 104, and Task 2 attaches shared memory region 108 to address space 106.

To enable broadcast functions, the tasks call MPI_Bcast. At some point in time, Task 0 copies data from its send buffer 110 in memory 102 to a shared memory buffer 112 within shared memory region 108. Task 0 further sets a flag in a shared memory control structure 114 of shared memory region 108.

Tasks 1 and 2 wait until the flag in shared memory control structure 114 is set. Then, Task 1 and Task 2 copy data out from shared memory buffer 112 into their respective receive buffers 116, 118. When the copying is complete, each of Task 1 and Task 2 notifies Task 0 it has finished copying the data and using control structure 114. If the message size is bigger than the shared memory buffer, then the above steps are repeated until all the data is transferred.

In the above example, data is copied to/from shared memory in order to transfer the data between the tasks of a collective communication. This approach is static in terms of the memory attachment, and thus, the application pays for one shared memory set up cost. It works best for transferring small messages, since the cost of doing two memory copies is small or can be ignored. However, for large messages, this approach is inefficient for various reasons. For example, data transfers are staged through the shared memory buffer. From the source to the destination of the data, data is copied twice, which results in inefficiency for both the data transfer time and the central processing unit (CPU) load. This is more severe in systems where memory bandwidth is a bottleneck, since the memory subsystem is stressed further by the extra copies. Further, the size of the shared memory buffer is limited. Moreover, buffer reuse (including double buffering, and circular buffering) requires synchronization, which tends to be expensive for MPI collectives having large numbers of tasks. For some MPI collective communications, data transfers are serialized by going through the shared memory buffer. For example, unlike in the MPI_Bcast where the root sends identical messages to tasks, in MPI_Gather, the root receives data from participating tasks. If the above approach is to be used in MPI_Gather, data transfer from the buffer in the shared memory region to the root's receive buffer becomes a bottleneck. The root cannot transfer the data all at once, although other tasks can transfer data to the shared memory buffer concurrently. Loss of concurrency is another drawback of this approach.

Figure 2:
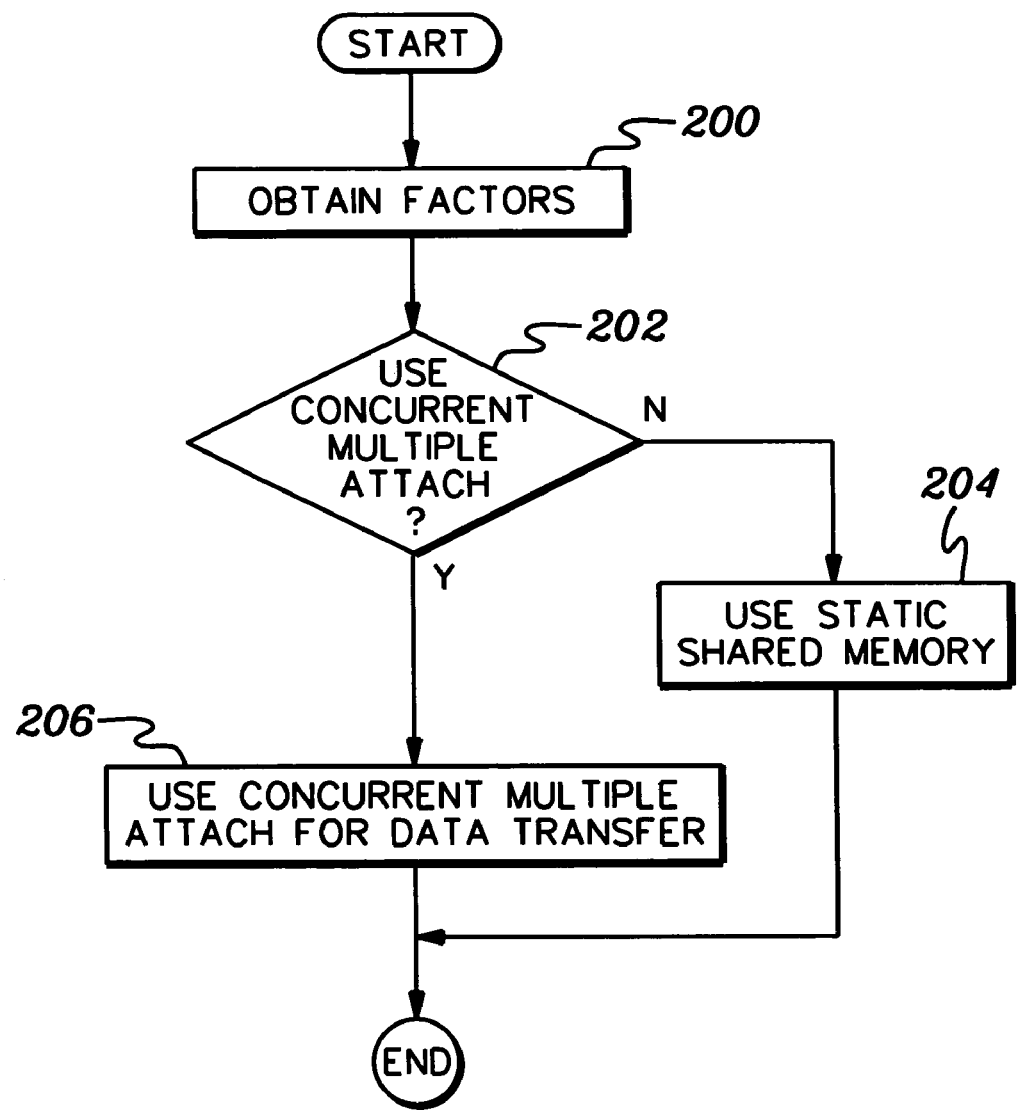
FIG. 2 depicts one embodiment of the logic associated with determining the appropriate transfer mechanism to be used to transfer data between tasks of a collective communication, in accordance with an aspect of the present invention.

To address the above deficiencies, a capability is provided herein to enable data transfer without copying the data to/from shared memory. This capability is referred to herein as a concurrent multiple attach facility, which provides dynamic cross-memory attach for collective communications. Although the concurrent multiple attach facility can be used for both small and large messages, in one example, it is used for large messages and the static shared memory approach is used for small messages. This is due to the extra costs associated with setup/tear down overhead per MPI call associated with the concurrent multiple attach facility. The determination as to which approach to use is dynamically made. One embodiment of the logic associated with this dynamic determination is described with reference to FIG. 2. In one example, this logic is executed in the user space of each task participating in the collective communication.

Initially, one or more factors are obtained (e.g., provided, determined, etc.), including, for instance, platform-independent factors, such as message size, and platform-dependent factors, such as memory copy bandwidth and the cost of the dynamic attach, STEP 200.

Thereafter, a determination is made as to whether the concurrent multiple attach facility is to be used, INQUIRY 202. This determination is based on the above factors, and in one particular example, on the size of the message. The consideration of whether a message is a small or large message depends on the underlying hardware and operating system characteristics. It is therefore designed to be tunable. However, in one example, a message is considered a large message, if it is greater than 32 k. If the message is considered a small message, then the traditional static shared memory technique is used, STEP 204. However, if the factors indicate that the static shared memory approach is not to be used, then the dynamic concurrent multiple attach facility is used, STEP 206. The decision of which facility to use is transparent to the application. Further, the switch point is tunable based on the factors. Moreover, if for some reason the concurrent multiple attach facility cannot be used, then processing falls back to the static approach, in which the collective communication is mapped into a set of point-to-point communications and carried out one by one.

Figure 3:
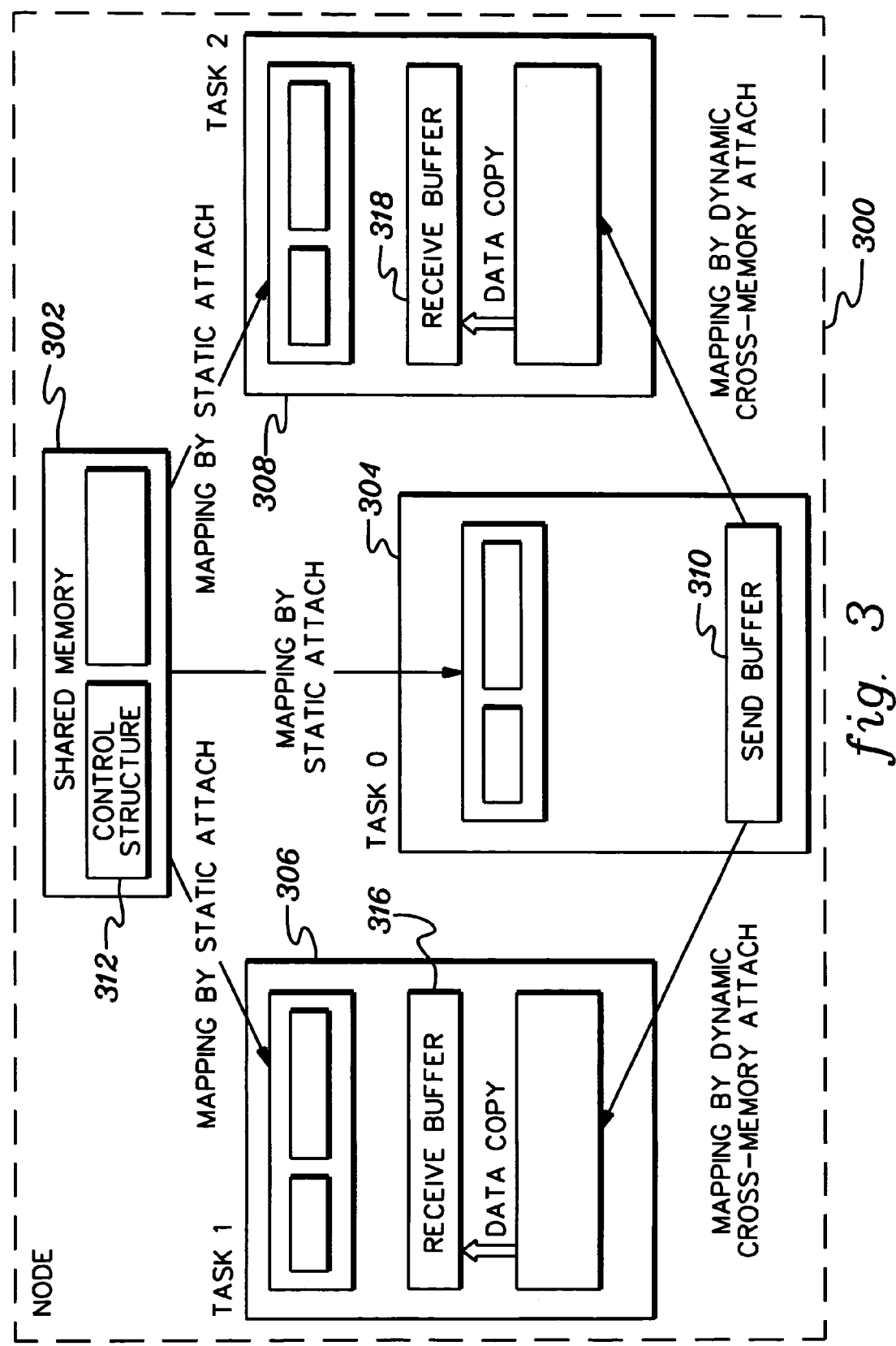
FIG. 3 is a pictorial representation of a broadcast operation utilizing the concurrent multiple attach facility of one aspect of the present invention.
Figure 4:
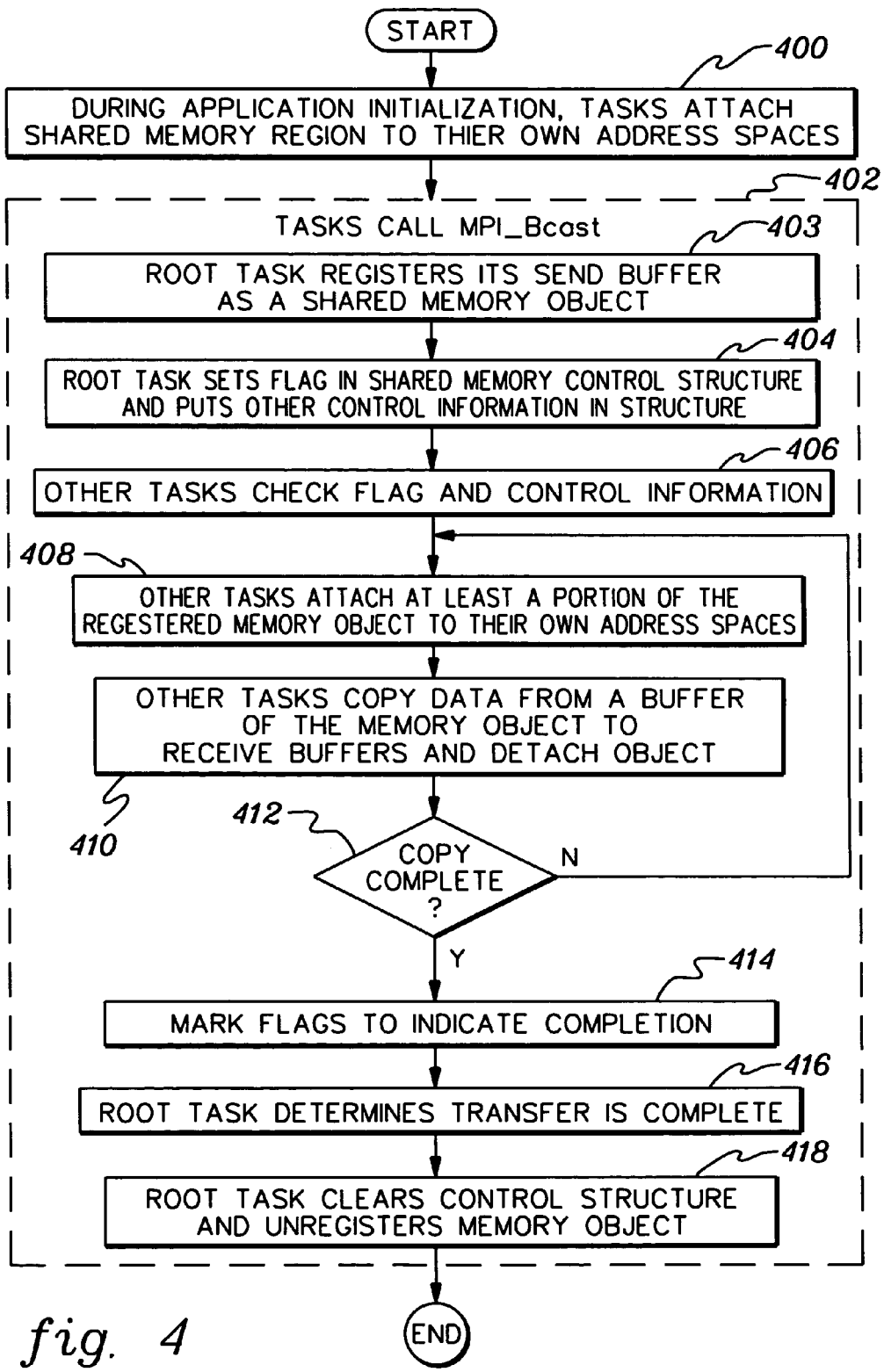
FIG. 4 depicts one embodiment of the logic associated with performing a broadcast operation using the concurrent multiple attach facility of an aspect of the present invention.

One embodiment of the logic associated with the concurrent multiple attach (CMA) facility (a.k.a., the dynamic cross-memory attach facility for collective communications) is described with reference to FIGS. 3 and 4. In particular, FIG. 3 depicts one example of a pictorial representation of the processing, and FIG. 4 depicts one embodiment of the logic associated with the attach mechanism. The embodiment described in FIGS. 3 and 4 is for an MPI_Bcast communication. However, similar logic may be used for other types of communication. Broadcast and, in particular, MPI_Bcast is only one example.

In this particular embodiment, three tasks, Task 0, Task 1 and Task 2 of an application are executing on a node 300. Each task runs in its own address space which includes shared memory region 302. For instance, shared memory region 302 is mapped to address space 304 of Task 0, address space 306 of Task 1 and address space 308 of Task 2. These attachments are static attachments.

In accordance with an aspect of the present invention, a portion of Task 0's address space is made addressable by Task 1 and Task 2 via a dynamic cross-memory attach capability. The use of cross-memory attach is described in further detail with reference to FIG. 4. In this particular example, an MPI_Bcast function is described, but this is only one example. Other collective communications may incorporate and use one or more aspects of the present invention without departing from the spirit of the present invention. The logic of FIG. 4 executes in the user space of each task participating in the collective communication.

In one embodiment, during application initialization, a plurality of tasks of the application attach shared memory region 302 to their own address spaces, STEP 400. This is performed, for instance, via the shmget and shmatt system calls, which are provided with the operating system, such as AIX or Linux, offered by International Business Machines Corporation, Armonk, N.Y.

Thereafter, the tasks call MPI_Bcast, STEP 402. In this operation, as well as in other collective communications, each caller identifies the same task as the root. In the examples described herein, the root is Task 0; however, in other embodiments, the root may be another selected task.

During processing of the broadcast, the root task (e.g., Task 0) registers its send buffer (i.e., application data structure) 310 as a memory object to be exported, STEP 403. For instance, Task 0 registers send buffer 310 with the operating system kernel via a system call, such as _css_ shmem_register, that is provided, by the communications subsystem of which MPI is a part, as a cross-memory attach kernel extension. This system call produces a memory handle (that is, an object through which other tasks in the system can refer to the registered portion of the memory), which is returned to the registering address space. _css_shmem_register is described in further detail below, as well as in a co-pending U.S. Patent Application entitled "Efficient Shared Memory Transport In A Distributed Data Processing Environment," Blackmore et al., Patent Application Publication No. US 2004/0107419 A1, published Jun. 3, 2004, which is hereby incorporated herein by reference in its entirety.

Additionally, Task 0 sets a flag in a control structure 312 of shared memory 302, and stores collective communication meta data, such as a description of the data in send buffer 314 and/or the memory handle, in shared memory control structure 312, STEP 404. Task 1 and Task 2 then receive asynchronous notification that Task 0 would like to communicate with them or those tasks periodically check the flag in the shared memory control structure, STEP 406. The flag indicates that the data in the root's send buffer is ready for transfer.

Task 1 and Task 2 attach at least a portion of the registered memory object, which includes the send buffer, to their own address spaces through the cross-memory attach kernel extension, STEP 408. In one example, each task attaches that portion (e.g., a segment) of the memory object to which the attacher (or importer) is to have visibility. The attach allows each attaching task to treat the attached portion of the memory object as part of its own address space. This attach is accomplished by a system call that is provided by the communications subsystem of which MPI is a part via a kernel extension (e.g., _css_shmem_attach). The result of these actions is that the registered portions of the memory of Task 0 can now be directly addressed by Tasks 1 and 2, just as if those memory portions belong to those other tasks. The _css_shmem_attach system call is also described below, as well as in U.S. Patent Application "Efficient Shared Memory Transport In A Distributed Data Processing Environment," Blackmore et al., Patent Application Publication No. US 2004/0107419 A1, published Jun. 3, 2004, which is hereby incorporated herein by reference in its entirety.

As described above, in accordance with an aspect of the present invention, multiple tasks can concurrently attach the registered memory object to their own respective address spaces. To allow concurrent multiple attachment, changes were made to the _css_shmem_register system call, as well as to the kernel extension, as described below.

Subsequent to attaching the registered memory object, Task 1 and Task 2 copy data from the registered and attached portions of the memory (e.g., send buffer 310) to their respective receive buffers (i.e., application data structures) 316, 318 in address spaces 306 and 308, respectively, STEP 410. Moreover, optionally, Task 1 and Task 2 detach the registered memory object from their address spaces. In one example, to detach the attached memory object, _css_shmem_attach is invoked.

Thereafter, a determination is made as to whether the copy is complete, INQUIRY 412. If the copy is not complete, then processing continues with STEP 408. Otherwise, processing continues with STEP 414. At STEP 414, one or more flags are set in the shared memory control structure to indicate completion.

Subsequently, the root task, Task 0, determines that the transfer is complete (e.g., by checking one or more flags in the control structure), STEP 416, and performs clean-up, including, for instance, clearing the control structure and unregistering the memory object, STEP 418. To unregister the memory object, _css_shmem_register is invoked, in one example.

As described above, in order to carry out one or more aspects of the present invention, various system call interfaces are utilized including: (1) registering and releasing memory objects; and (2) attaching and detaching at least portions of memory objects. In order to provide function calls for registering and releasing and for attaching and detaching, command type, data type and structures are defined, as described below:

```
typedef int _css_mem_hndl_t;
enum _css_shmem_reg_cmd {
    CSS_SHMEM_REG, CSS_SHMEM_REL,
    CSS_SHMEM_REG_REL
};
enum _css_shmem_att_cmd {
    CSS_SHMEM_ATT, CSS_SHMEM_DET,
    CSS_SHMEM_ATT_DET
};
typedef struct _css_shmem_reg_info {
    int                command;
    _css_mem_handl_t   handl_in;
    _css_mem_handl_t   handl_out;
    unsigned int       pid_partner;
    long long          pointer;
    long long          len;
} _css_shmem_reg_info_t;
```

| | |
|---|---|
| Command | input, one of commands defined in css_shmem_reg_cmd. |
| Hndl_in | input, shared memory handle returned from previous register. |
| Hndl_out | output, shared memory handle returned after registering memory object. |
| Pid_partner | input, pid of the process which attaches to this memory region. |
| Pointer | input, pointer to the exported data memory object. |
| Len | input, length of that data memory object. |

```
typedef struct _css_shmem_att_info {
    int                command;
    _css_mem_hndl_t    hndl_att;
    _css_mem_hndl_t    hndl_det;
    int                pad;
    long long          req_ptr;
    long long          offset;
    long long          pointer;
    int                len_avail;
    int                att_offset;
} _css_shmem_att_info_t;
```

| | |
|---|---|
| Command | input, one of commands defined in _css_shmem_att_cmd. |
| Hndl_att | input, memory handle for attach, returned from previous register. |
| Hndl_det | input, memory handle for detach. |
| Pad | pad field. |
| Req_ptr | input, requested memory pointer in the partner's space. |
| Offset | input, offset from req_ptr to attach to. |
| Pointer | output, pointer to attached object in local address space. |
| Len_avail | output, amount of memory addressable from the attached memory object. |
| Att_offset | output, offset from attached memory object where data is located. |

The Interface semantics for those functions are described below in detail.

---

_css_shmem_register                         System Call
Purpose
   Register and/or release a virtual memory region.
       int _css_shmem_register(_css_shmem_reg_info_t ptr_inout)
Parameters
       ptr_inout IN/OUT    The pointer to structure of
                           _css_shmem_reg_info_t,
                           as described above.

---

Description

The function "_css_shmem_register" is provided to register and/or release a memory object which is attachable by another process. A pointer to structure _css_shmem_reg_info_t is the input argument. If the command is CSS_SHMEM_REG or CSS_SHMEM_REG_REL, hndl_out is returned in structure _css_shmem_reg_info_t, which is used by _css_shmem_attach. If the command is CSS_SHMEM_REL or CSS_SHMEM_REG_REL, the registered memory object associated with hndl_in is released. It is noted here that the notation above follows C programming language conventions in which constants are defined with all letters capitalized. However, other notations for other programming languages may be used.

---

Return Values:
   _css_shmem_attach                        System Call
Purpose
Attach or detach at least a portion of a memory object previously registered by another process.
       int _css_shmem_attach(_css_shmem_att_info_t ptr_inout)
Parameters
       ptr_inout INOUT     The pointer to structure to
                           _css_shmem_att_info_t,
                           as described above.

---

Description

The function "_css_shmem_attach" is provided to attach or detach a portion of memory previously registered by another process. The input parameter is a pointer to _css_shmem_att_info_t structure which stores all information of a memory portion to be attached or detached. If the command is CSS_SHMEM_ATT or CSS_SHMEM_ATT_DET, a portion of registered memory object associated with hndl_att is attached to the current address space. If the command is CSS_SHMEM_DET or CSS_SHMEM_ATT_DET, the object associated with hndl_det is detached. The parameters handle_att and handle_det can be the same if, for example, the caller wishes to reference a different portion of a registered memory object. The attach and/or detach operation fails if the referenced handle is not valid.

In accordance with an aspect of the present invention, the process id (e.g., Pid_partner) of the _css_shmem_register system call is not used to determine if the task may attach to the memory object. That is, it is no longer a requirement that only one task may attach at a time. Instead, multiple concurrent tasks may attach to the memory object. Thus, a linked list is used to keep track of the tasks that are attached, and for each task, the location of that task's address space to which at least a portion of the memory object is attached.

Moreover, in accordance with a further aspect of the present invention, the kernel extension is modified to prevent a hang or deadlock condition, if the cross-memory resources are over utilized. To explain, in the point-to-point case, a hang condition is not addressed, since only a single task attaches to the exported memory. If it does not get the required resources, it can send a message back to the register of the memory and an alternate path may be used to send the data. In the collective case, however, the situation is more complicated. In this case, the multiple independent tasks attach to the same user memory. Since one task may not join the collective call for a long while, each task waits until all tasks join and signal that they have joined and have either attached the memory or registered a portion of their own memory. If one task does not get the required resources, then the collective call may hang. Thus, modifications are provided in the kernel extension to deal with this problem.

For instance, when a task waits for other tasks to use the cross memory attach of its memory, it goes to sleep in the kernel. In accordance with an aspect of the present invention, this sleeping thread can be awakened under various conditions: First, if the kernel resource set aside for cross memory attach exceeds a usage threshold, then this sleeping thread is awoken with a threshold event. This prevents a hang condition, since this threshold event is received on all sleeping threads, allowing these threads to implement the collective call in an alternate manner. Second, the user can optionally choose to have the thread awoken after a certain time period. Third, another process could wake the sleeping thread.

Described above is one example in which a concurrent multiple attach facility is used in a broadcast collective communication. Without the concurrent multiple attach facility, the registered memory object can be attached only by one task at a time and the data transfers have to be serialized. However, with the concurrent multiple attach facility, the memory object can be attached by multiple tasks.

Other collective communications can also benefit from one or more aspects of the present invention. For example, a scatter function (e.g., MPI_Scatter) can benefit. In this operation, the data transfers can be performed concurrently, since there is no need to stage through a statically attached shared memory region. MPI routines are usually used in resource-intensive scientific and technical applications. The time and resources used by MPI routines are, from the application's point of view, communication overhead. In the case of MPI collective communications, certain resources including CPU time are dedicated for data transfer by every task. The capacity of all tasks transferring data concurrently allows for better CPU utilization during the MPI collective communication, minimizing the communication protocol overhead for the application.

As yet another example, a gather operation (e.g., MPI_Gather) benefits from one or more aspects of the present invention. In MPI_Gather, the root task is the destination or sink for multiple data transfers. Thus, to allow concurrency and to minimize communication protocol overhead, a push model of data transfer is provided in the cross-memory attach facility.

Figure 5:
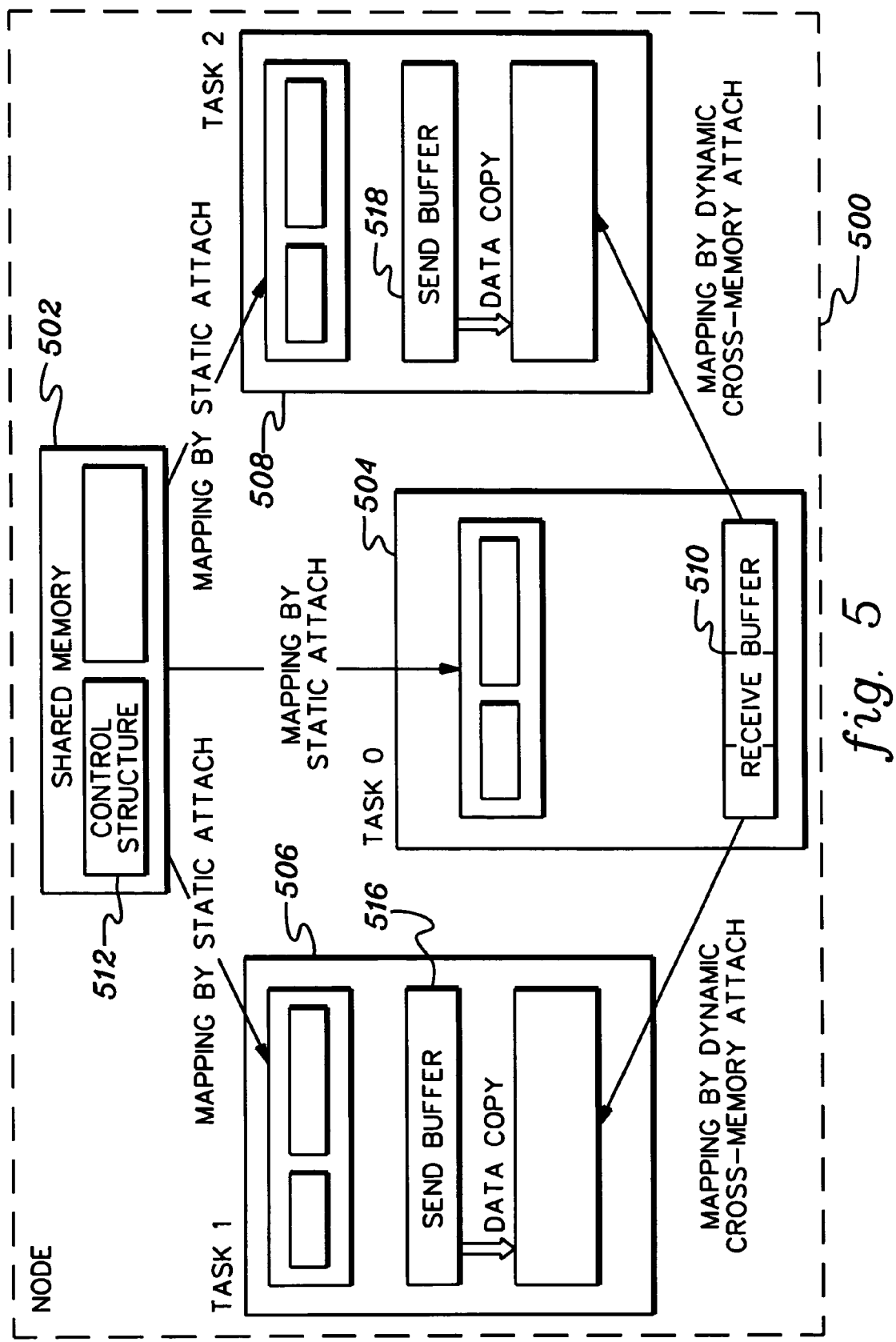
FIG. 5 is a pictorial representation of a gather operation in which a concurrent dynamic cross-memory attach facility is used, in accordance with an aspect of the present invention.
Figure 6:
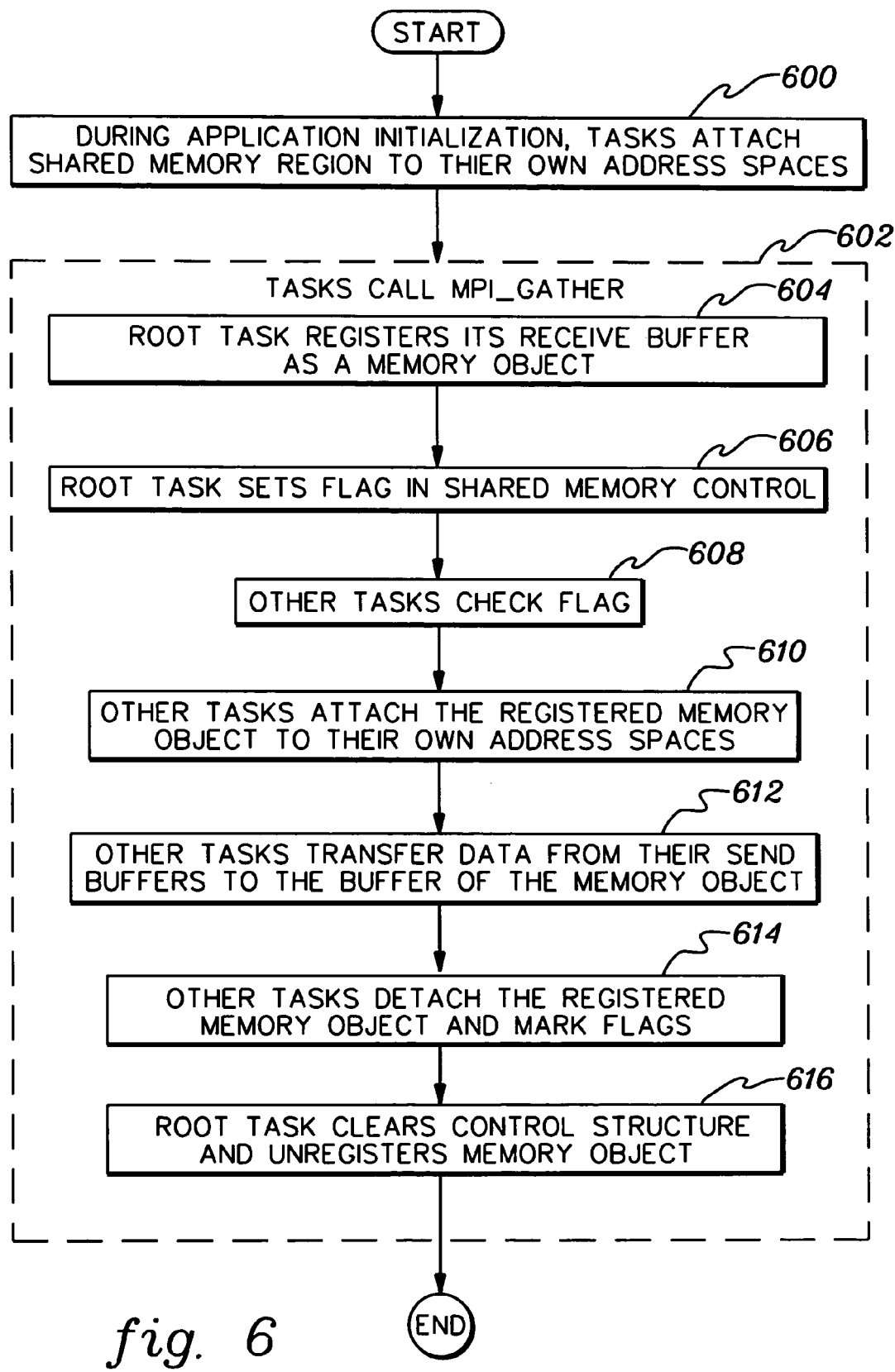
FIG. 6 depicts one embodiment of the logic associated with processing a gather operation in which data is transferred between tasks of an application without copying the data to and from shared memory, in accordance with an aspect of the present invention.

One embodiment of the logic associated with performing an MPI_Gather communication is described with reference to FIGS. 5 and 6. In this particular embodiment, three tasks, Task 0, Task 1 and Task 2, of an application are executing on a node 500. Each task runs in its own address space and the address space of each task is attached to a shared memory region 502. For instance, an address space 504 of Task 0 is attached to shared memory 502, an address space 506 of Task 1 is attached to shared memory 502 and an address space 508 of Task 2 is attached to shared memory 502. These attachments are static attachments.

In accordance with an aspect of the present invention, the address space (e.g., a portion thereof) of Task 0 (the root task in this example) is also addressable by Tasks 1 and 2 via a dynamic cross-memory attach capability. The use of cross-memory attach for MPI_Gather is described in further detail with reference to FIG. 6. The logic of FIG. 6 executes in the user space of each task participating in the collective communication.

In one embodiment, during application initialization, a plurality of tasks of the application statically attach shared memory region 502 to their own address spaces, STEP 600. This is performed, for instance, via the shmget and shmatt system calls provided with the operating system.

Thereafter, the tasks call MPI_Gather, STEP 602. During processing of the gather operation, the root task (e.g., Task 0) registers its receive buffer (i.e., application data structure) 510 as a shared memory object, STEP 604. For instance, Task 0 registers the receive buffer with the operating system kernel via a system call, such as _css_shmem_register, that is provided by the MPI subsystem as a cross-memory attach kernel extension.

Additionally, Task 0 sets a flag in a control structure 512 of the shared memory region, and stores collective communication meta data, such as a description of the layout of the receive buffer and/or the memory handle returned from the register function, in shared memory control structure 512, STEP 606. Task 1 and Task 2 then receive asynchronous notification that Task 0 would like to communicate with them or they periodically check the flag in the shared memory control structure, STEP 608. The flag indicates that the receive buffer is ready for the transfer.

Task 1 and Task 2 attach the registered memory object, which includes the receive buffer, to their own address spaces through the cross-memory attach kernel extension, STEP 610. Specifically, in one example, each task only attaches that portion of the receive buffer to which it is going to write data. For instance, each task has a rank. The MPI_GATHER call has a parameter that gives the message size. The semantic of MPI_GATHER stipulates that the receive buffer has space for a message from each task with rank 0 sending to the first part, rank 1 to the next, etc. That allows each task with data to deliver to calculate a displacement in the receive buffer. With the support of concurrent multiple attachment, Task 1 and Task 2 attach concurrently.

Task 1 and Task 2 then transfer data from their buffers (i.e., application data structure) 516, 518, respectively, to the appropriate addresses in the attached memory object, STEP 612.

Once data transfer is complete, Task 1 and Task 2 optionally detach the registered data object and mark flags in the shared memory control structure to reflect the same, STEP 614. Task 0, upon noticing that Task 1 and Task 2 have finished the data transfers, clears the shared memory control structure and unregisters its receive buffer, STEP 616.

As described above, the receive buffer of the root task of the MPI_Gather communication is registered, so that other tasks can attach and copy data to it. This enables multiple pushing engines, each with a different CPU, to work concurrently to deliver data, and only utilizes one pair of register/unregister functions.

In some MPI collectives, such as MPI_Gather and MPI_Scatter, tasks attach to the same registered memory object, but copy data from/to different portions of the object. Thus, task specific MPI data type information is needed for different tasks. Furthermore, the MPI standard allows, in collective communications, different data distribution at different tasks, as long as data type signatures are identical, e.g., ten integers in any distribution match ten integers in any other distribution because the signature is still ten integers. Thus, since the cross-memory attach mechanism bypasses any intermediate buffer and possible data pack/unpack, for efficient discontiguous data type and non-uniform data distribution handling, a data gather/scatter-redistribution machine (DGS-RM) is integrated, in one embodiment, into the cross-memory attach mechanism for MPI collective communications. DGS-RM supports data transfer between two non-uniform, discontiguous application data structures, both within a single address space and via cross-memory attach. There is a potential for using DGS-RM in any situation where possibly discontiguous data residing in one address space is to be copied to another address space where the destination layout is also potentially discontiguous. One embodiment of DGS-RM is described below with reference to FIGS. 7-12.

Figure 7:
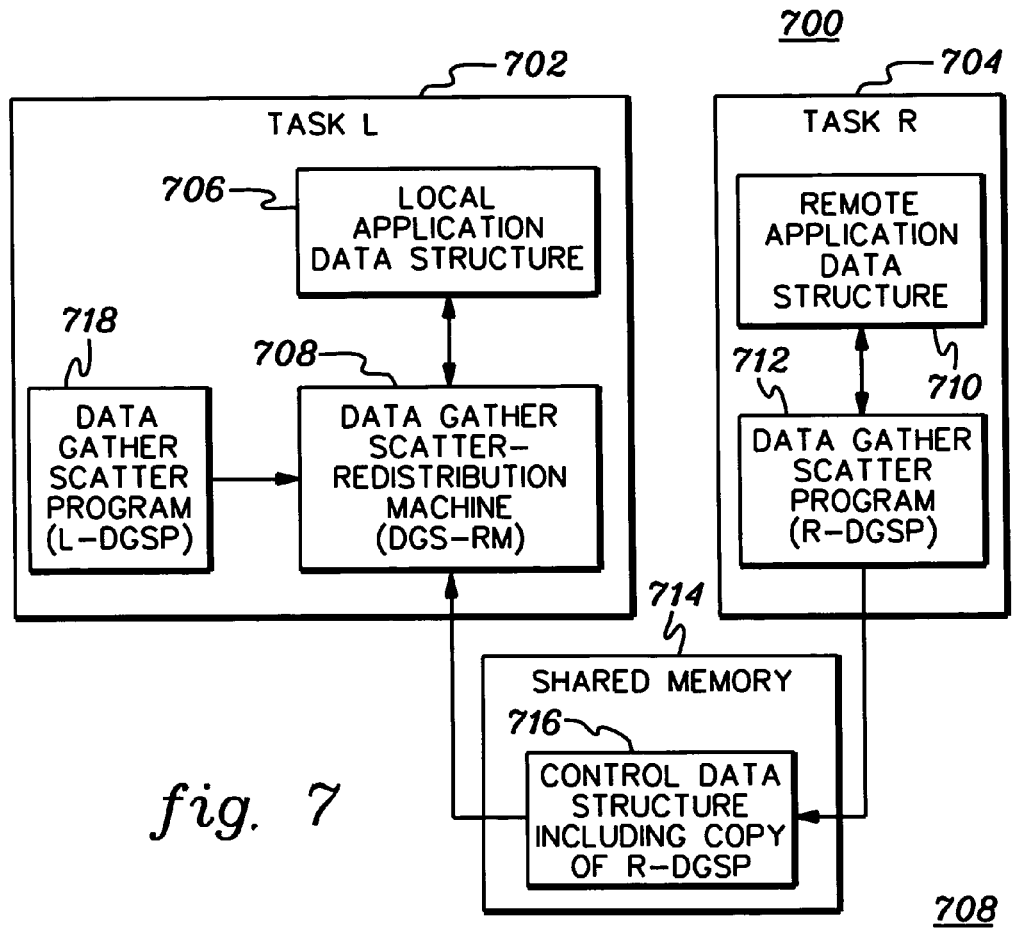
FIG. 7 depicts one example of a cross-memory attach system, in accordance with an aspect of the present invention.

Referring initially to FIG. 7, a Task-L running in address space 702 and a Task-R running in address space 704 each owns an application data structure 706, 710, respectively. A DGS-RM 708 runs in a single task space, so when there are two tasks involved, one side of the data transfer is chosen to run the DGS-RM. This means one data gather/scatter program (DGSP) 712 originates in an exporting task space (i.e., the space registering the memory object) remote from the DGS-RM 708 and the DGSP 712 is to be first delivered to the task which is to run the DGS-RM 708 by copying it to a shared memory 714, which is visible to the task which will run DGS-RM 708. The compactness and portability of a DGSP 712 makes this practical.

The task space in which DGS-RM 708 runs, or the attaching task space, is referenced as Task-L 702 (for local) and the task where the remote application data structure 710 and DGSP 712 reside is Task-R 704 (for remote). When there is one source data structure and one destination data structure, the decision as to which process is to run the DGS-RM 708 is arbitrary. In one example, Task-L 702 is selected to run DGS-RM 708 and Task-R 704 sets up for that run by exporting the address range (i.e., memory object) containing its application data structure 710 and copying its DGSP 712, as well as information needed for attaching that exported range, to a control data structure 716 located in shared memory 714 where DGS-RM 708 can access it.

As part of the action of exporting an address range, a task returns a cross-memory handle (identifier) which another task can use to attach that memory, as described above. This handle is among the information transferred in the shared memory control space 716.

Figure 8:
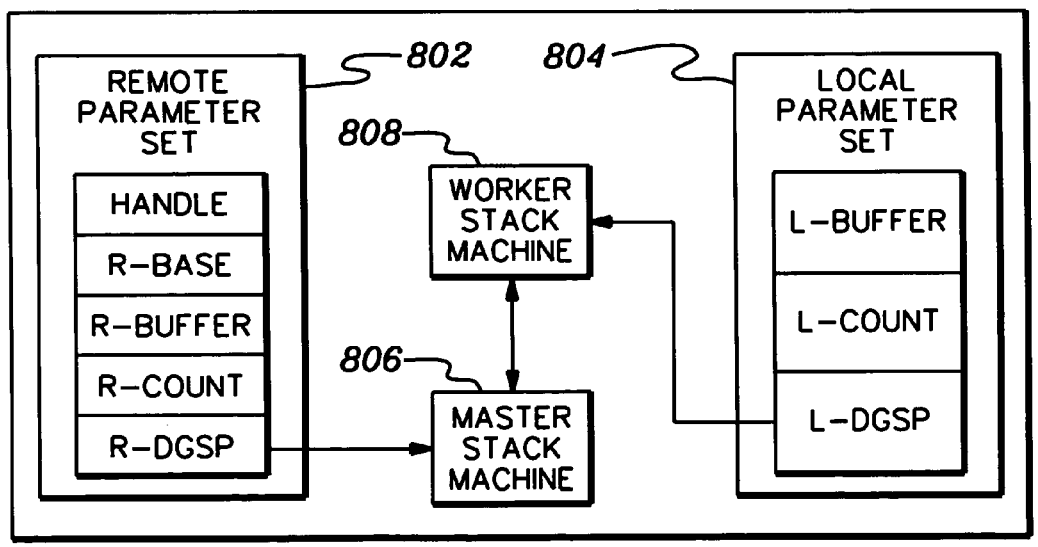
FIG. 8 depicts one example of a data gather/scatter-redistribution machine (DGS-RM) of the cross-memory attach system of FIG. 7, in accordance with an aspect of the present invention.

Referring now to FIG. 8, when DGS-RM 708 is to start in task space L 702, it inputs a parameter set 802 (handle,R-base,R-buffer,R-count,R-DGSP) representing the remote application data structure 710, delivered via the control data structure 716 in the shared memory region 714, and a second locally available parameter set 804 (L-buffer,L-count,L-DGSP) representing the local data structure 706. The DGS-RM routine 708 then creates and runs two stack machines, one for each DGSP. Of the two machines, one has a role as master machine 806 and the other as a worker machine 808. In one embodiment of this cross memory implementation, the master DGSM 806 interprets R-DGSP 712, while the worker DGSM 808 interprets L-DGSP 718. The reverse convention in which the worker processes R-DGSP is also workable, but this choice to have R-DGSP be processed by the master makes the management of segment boundaries (to be discussed below) easier to implement.

For convenience, the operation is viewed from the vantage of the local task 702 running DGS-RM 708 rather than from the remote process 704 exporting a memory object. Thus, there are two modes of operation: push and pull. This classification is based on whether the data is pulled from the remote process' 704 exported memory or pushed into it. In the pull mode, the master machine is for the gather side data handling and the worker machine is for the scatter side, while the other way around is the push mode. By incorporating two DGS-RM running modes, the decision of where the DGS-RM runs is independent of the direction in which the data is to flow. This allows more versatility in choosing the specific side of the transfer on which to run the DGS-RM, allowing for consideration of other factors in addition to the data movement direction. In one embodiment of the cross-memory attach mechanism of the present invention, data transfer is carried forward (i.e., the DGS-RM is run) by the task which attaches the registered memory object. This attaching task can be either the source of the data or the destination. A single export (i.e., registration) can include a number of memory segments, but the import (i.e., attach) is performed one segment at a time, so special treatment is needed for application data structures that cross a segment boundary in the registered shared memory region. In a present embodiment, implementing this logic in master machine 806 is more convenient.

The worker stack machine 808 within DGS-RM 708 is similar to a basic DGSM, an example of which is described in a U.S. patent application entitled "Data Gather/Scatter Machine," Ser. No. 09/517,167, filed on Mar. 2, 2000, which is hereby incorporated herein by reference in its entirety. Each activation of worker machine 808 by master 806 is provided an address of an accessible contiguous chunk of remote memory and the number of bytes to be copied into that segment in the push mode, or to be copied out of that segment in the pull mode. Like the difference between the gather and scatter in running DGSM, the difference between the DGS-RM worker machine 808 running in the two modes lies in the handling of the COPY instruction; in which direction it copies the specified number of bytes.

Note that a "chunk" of memory is any contiguous portion of memory defined by the layout of the application data structure, regardless of length or segment boundaries (i.e., the size of one chunk may or may not be the same size as another chunk and may not necessarily be contained within a single memory segment). For purposes of this application, the words "chunk", "block", and "section" may be used interchangeably, even though there may be slightly different connotations in meaning.

The master stack machine 806 is a variant of a DGSM. In the basic DGSM, a COPY instruction represents a contiguous chunk of an application data structure and enough bytes are to be copied from a staging or other contiguous buffer to fill it for scatter, or to drain it for gather. In DGS-RM, a master machine COPY instruction still represents a contiguous chunk of an application data structure to be filled/drained. But rather than transferring the contiguous chunk by a memory copy, the COPY instruction invokes worker machine 808 to process the data.

Figure 9:
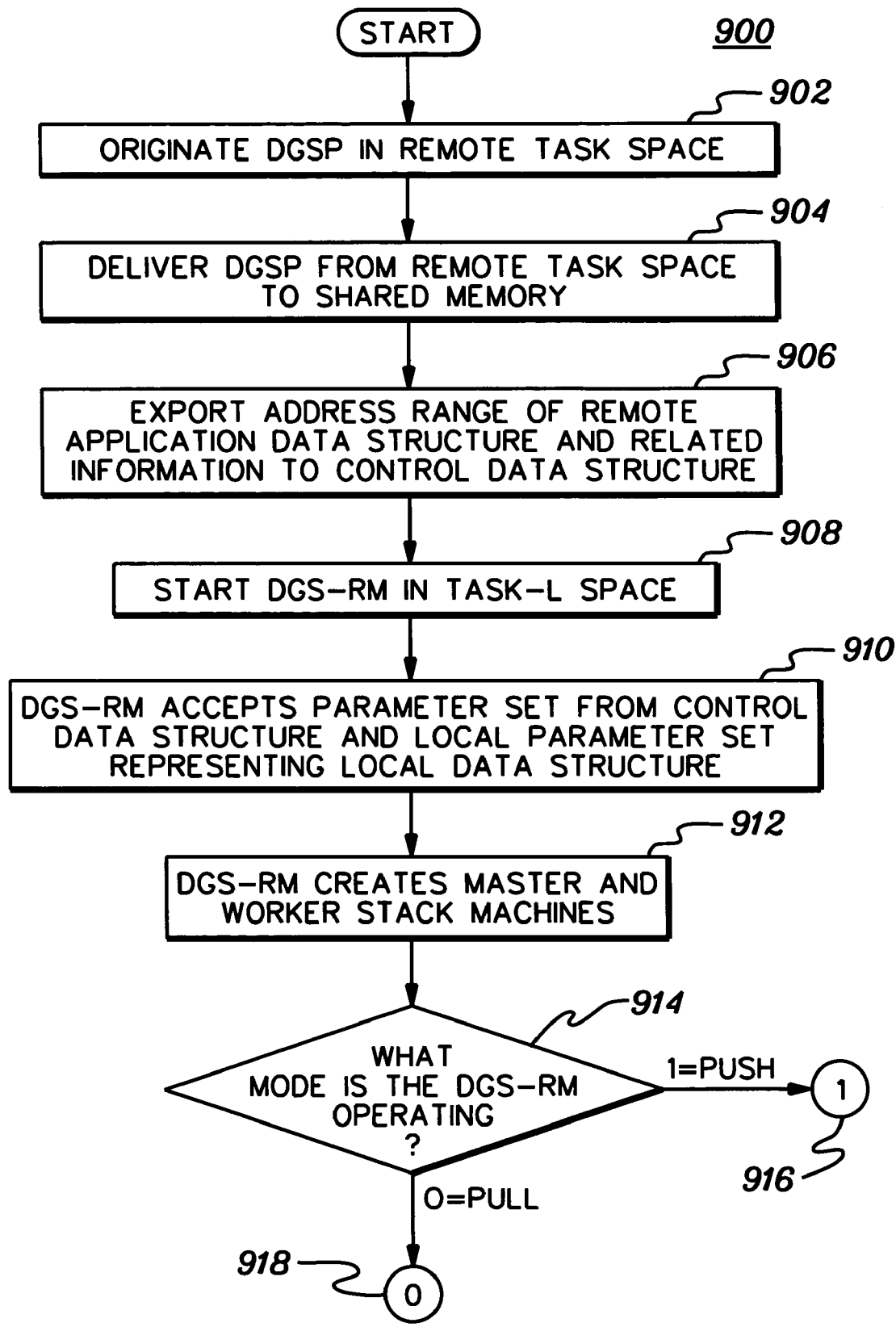
FIG. 9 depicts one embodiment of the logic associated with performing a cross-memory attach function using a DGS-RM, in accordance with an aspect of the present invention.

One embodiment of an operational flow diagram of the cross memory attach function is depicted in FIG. 9. First, a DGSP 712 is originated in remote task space 704, STEP 902. A DGSP is a low level program compiled for each MPI datatype an application constructs. A DGSP runs on a stack machine (DGSM) implemented in software to interpret the layout of a datatype and handle the data transfer. The DGSP 712 is delivered, from remote task space 704 to shared memory 714, STEP 904. At STEP 906, the address range of remote application data structure 710, and the above mentioned related information (handle) are also exported to a control data structure 716 within shared memory 714. Next, DGS-RM 708 is started in local task space 702, STEP 908. DGS-RM 908 accepts remote parameter set 802 from control data structure 716, as well as a local parameter set 804 representing the local data structure 706, STEP 910. Next, at STEP 912, DGS-RM 708 creates a master stack machine 806 and a worker stack machine 808, and then determines the operating mode (pull or push), INQUIRY 914. If the operating mode is push, DGS-RM 708 performs the push function 916 shown in FIG. 10. If the operating mode is pull, DGS-RM 708 performs the pull function 918 shown in FIG. 11.

Figure 10:
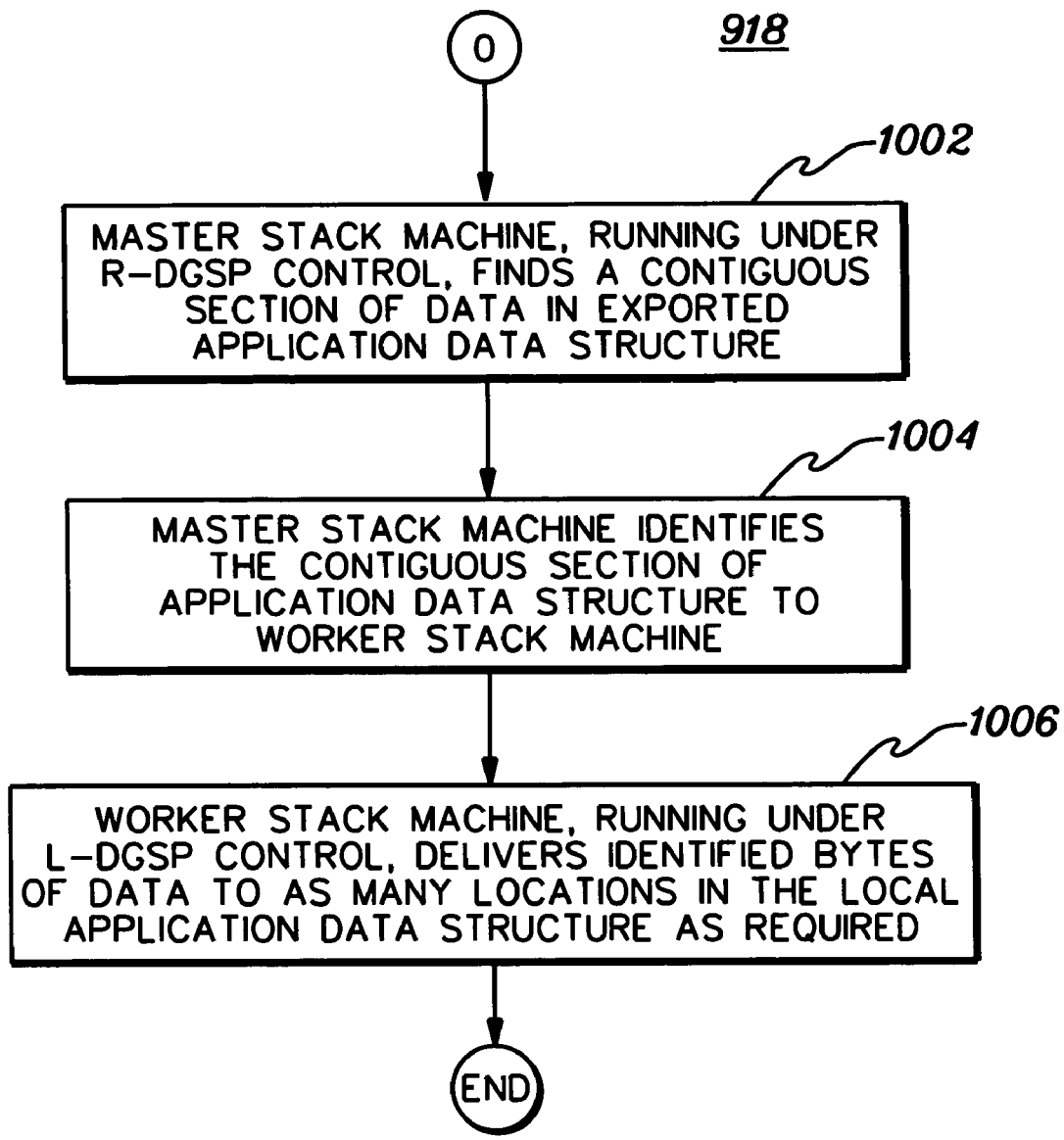
FIG. 10 depicts one example of the logic associated with performing a cross-memory attach function using a DGS-RM operating in pull mode, in accordance with an aspect of the present invention.

In pull mode 918, an example of which is described in detail in FIG. 10, master stack machine 806, running under the control of remote DGSP 712, identifies (or attaches) a contiguous chunk of data in exported application data structure 710, STEP 1002. The specific steps for performing the attach function are discussed in further detail below. A state cache tracks the current iteration of both the master 806 and worker machines 808. Master stack machine 806 identifies the contiguous chunk of the remote application data structure 710 to the worker machine 808, STEP 1004. Worker stack machine 808, running under the control of local DGSP 718, delivers these identified bytes of data to as many locations in the local application data structure 706, as required, STEP 1006.

Figure 11:
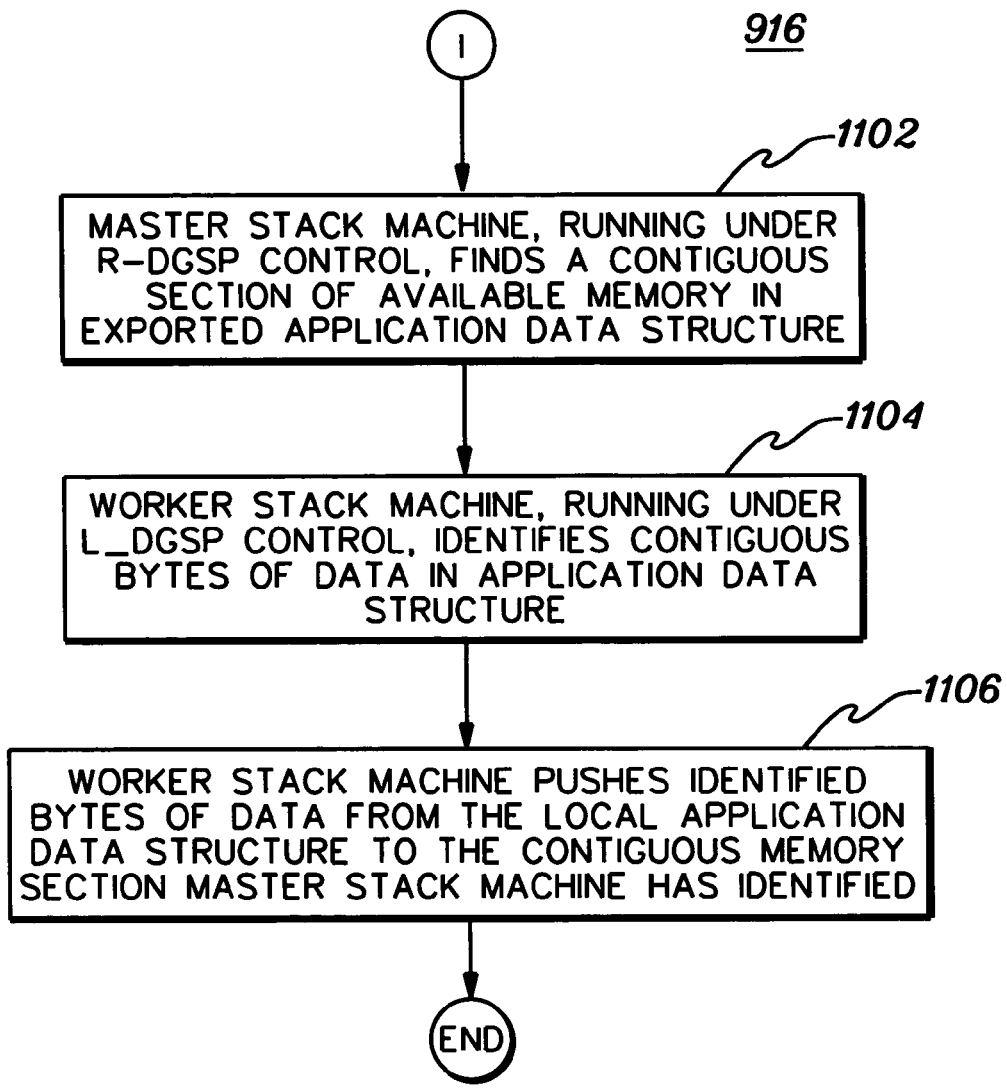
FIG. 11 depicts one embodiment of the logic associated with performing a cross-memory attach function using a DGS-RM operating in a push mode, in accordance with an aspect of the present invention.

Push mode 916 operates similarly to pull mode 918. In this case, master stack machine 806, running under control of R-DGSP 712, attaches a contiguous chunk of available memory in the exported application data structure 710, STEP 1102 (FIG. 11). In particular, each segment of the exported memory is mapped to a specific location in the local address space. Then, at STEP 1104, worker machine 808, under L_DGSP 718 control, identifies contiguous bytes of data in local application data structure 706 and pushes these bytes to the contiguous memory in the remote application data structure 710 that the master machine has identified, STEP 1106.

Figure 12:
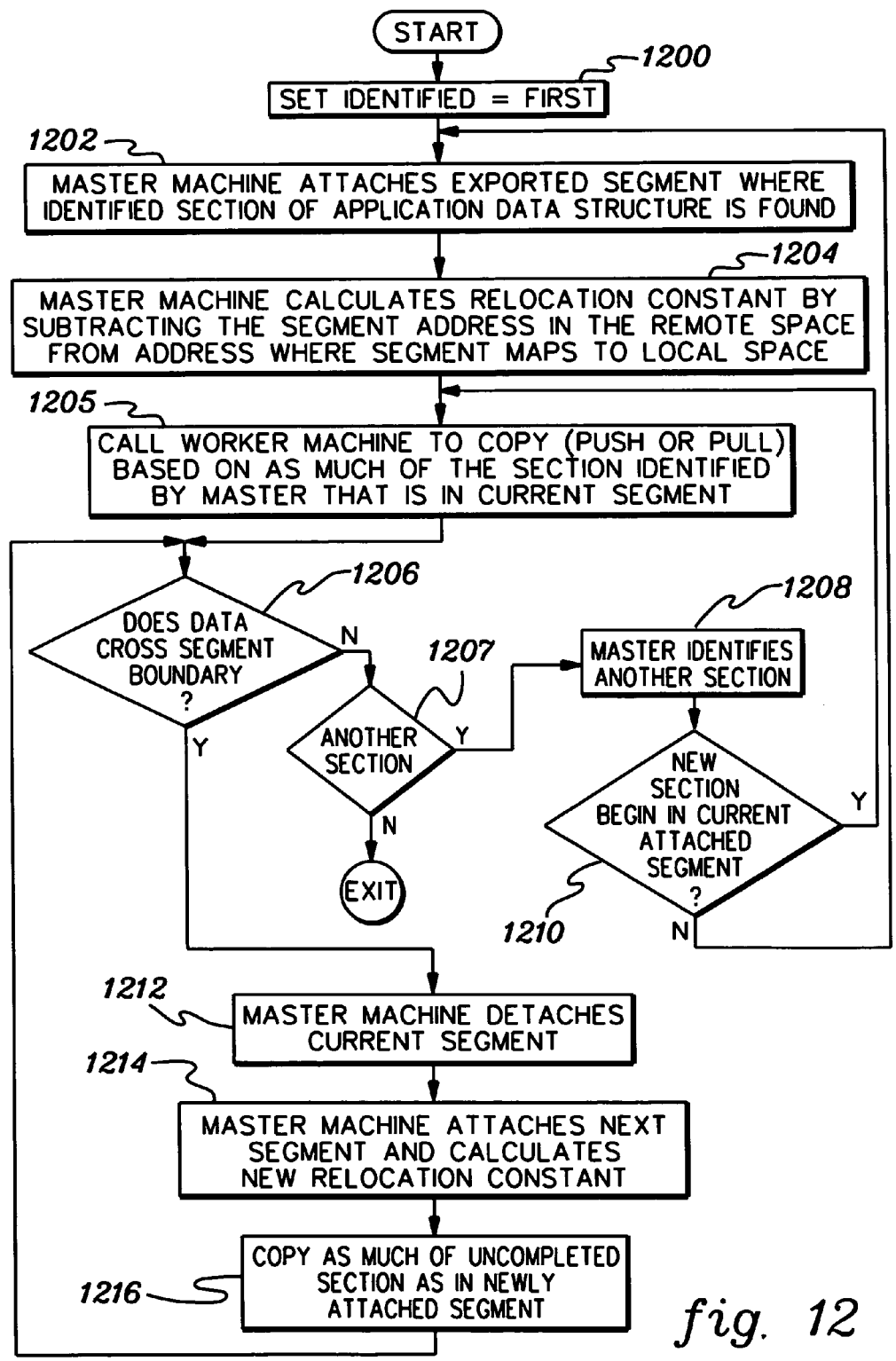
FIG. 12 depicts one embodiment of the logic associated with executing an attach function, in accordance with an aspect of the present invention.

Referring to FIG. 12, one embodiment of the logic associated with the attach sequence performed by master machine 806 is discussed in detail. Initially, a variable, referred to as identified, which is used in the attach processing, is set to first. At DGS-RM startup there is no segment attached, so master machine 806 attaches the exported segment where the identified (e.g., first) chunk of the application data structure begins, STEP 1202. As an example, assume the address of this first chunk is very near the end of segment three of the exporting task's virtual memory, so nine chunks are in segment three and the last chunk is in segment four. Assume the operating system maps the first attach to segment seven of the attaching side address space. To allow the DGS-RM master machine to run as if it were processing within the flat virtual address space in which the DGSP and remote application data structure 710 reside, a relocation constant, C, is calculated at attach time by subtracting the segment address in the exporting address space (R-base) from the address at which the segment maps in the attaching space (a value returned by the function call to do the attach), STEP 1204. In this example, C for the first attach is 0×40000000 and the master machine generates address sequence (A+C+0, A+C+40 . . . , A+C+360).

Thereafter, the master machine calls the worker machine to copy (push or pull) the data based on as much of the section identified by the master that is in the current segment, STEP 1205.

A determination is then made as to whether the data crosses the segment boundary, INQUIRY 1206. If the exported data object is contained within a segment, then a further inquiry is made as to whether there is another section to be processed, INQUIRY 1207. If not, then processing is complete. However, if there is another section of the application data structure, master machine 806 identifies the section, STEP 1208. Then, a determination is made as to whether the new section begins in the currently attached segment, INQUIRY 1210. If so, processing continues with STEP 1205. Otherwise, processing continues at STEP 1202.

Returning to INQUIRY 1206, if the exported data object spreads across a segment boundary, master machine 806 detaches the current segment, STEP 1212, attaches the segment in which the next chunk is found and calculates a new relocation constant, STEP 1214. For the above example, if the operating system maps the newly attached segment (segment four in the exporting address space) again to segment seven in the attaching address space, the new relocation constant, C, becomes 0×30000000 and the location of the last chunk is still (A+C+360). The modification of C hides the complexity of segment mapping from the rest of the DGS-RM master machine. In the rare case where a single chunk of a data object lies across one or more segment boundaries, the DGS-RM simply calls the worker machine to process that part of the chunk in the current attached segment, replaces the current attach with the next segment containing the continuation of the chunk, and has the worker process that continuation before going on to identify another chunk.

Subsequent to attaching the next segment and calculating a new relocation constant, the worker machine copies as much of the uncompleted section as in the newly attached segment, STEP 1216, and processing continues with INQUIRY 1206.

Further details regarding data gather/scatter machines and the data gather/scatter-redistribution machine are described in U.S. patent application entitled "Data Gather/Scatter Machine," Ser. No. 09/517,167 filed on Mar. 2, 2000, and co-filed U.S. patent application entitled "Data Gather/Scatter-Redistribution Machine," Jia et al., each of which is hereby incorporated herein by reference in its entirety.

Described in detail above is a capability that enhances intra-node communications for collective communications. The data is transferred without copying the data to and from shared memory. Instead, tasks of an application concurrently attach a registered memory object (at least a portion thereof) of an exporting task to their own address spaces and copy the data directly to or from that registered object from/to their own memory at defined locations. The registration is performed on the fly and the attachment is dynamic.

Advantageously, one aspect of the present invention integrates both the static shared memory optimization which provides better performance for small messages and the dynamic concurrent memory attach for large messages. In one aspect of the present invention, a switch is made from the static shared memory attach to the cross-memory attach mechanism should the benefit of the cross-memory attach mechanism exceed the cost per MPI call. The switch point is tunable based on platform independent factors, such as message size, and platform dependent factors, such as memory copy bandwidth and the cross-memory attach costs. If the collective level shared memory optimization cannot be established, the implementation falls back to traditional collective techniques in which the collective communication is mapped into a set of point-to-point communications and carried out one by one. The switch is transparent to the application.

Figure 13:
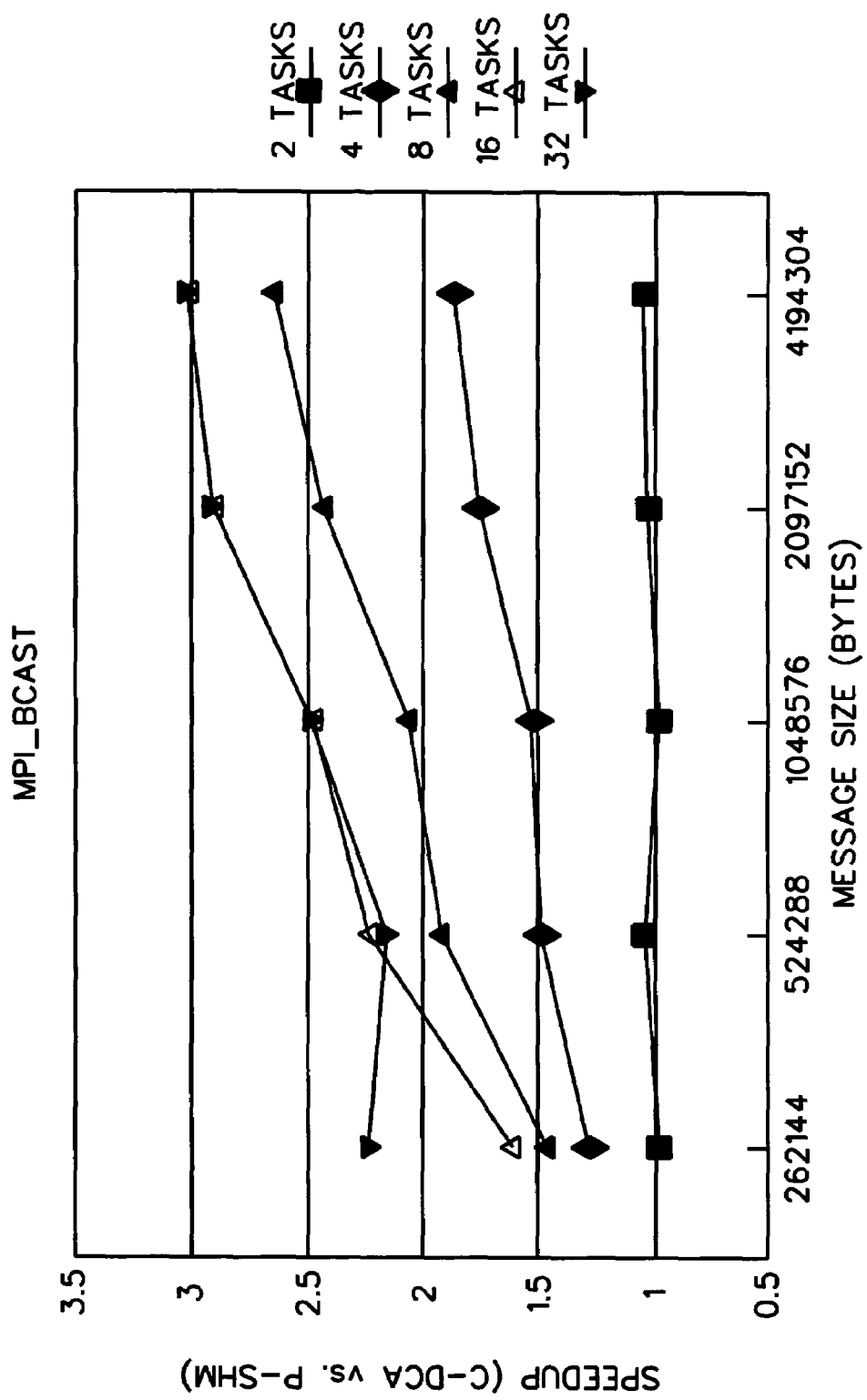
FIG. 13 depicts one embodiment of performance data for a broadcast operation, in accordance with an aspect of the present invention.
Figure 14:
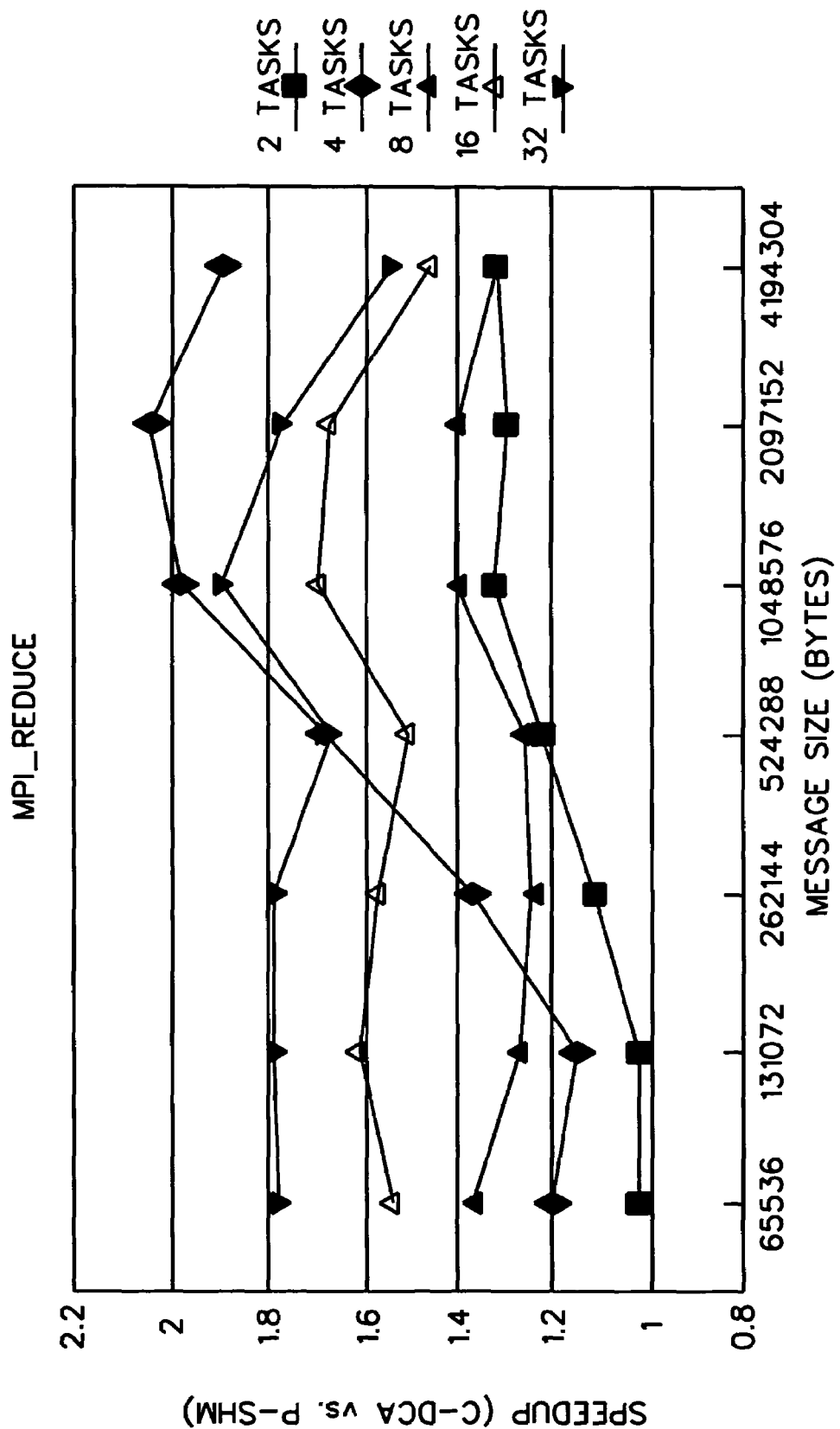
FIG. 14 depicts one embodiment of performance data for a reduce operation, in accordance with an aspect of the present invention.

The performance speedups of using the collective level of shared memory optimization with the dynamic cross-memory attach mechanism over the point-to-point level shared memory optimization is shown in FIG. 13 for MPI_Bcast and FIG. 14 for MPI_Reduce. In each of these cases, the performance test results are from the PALLAS benchmarks running on IBM eServer P690, which is in Full System Partition Mode (32-way SMP).

In addition to the above, advantageously, an efficient handshaking mechanism has been provided in which through the shared memory control structure, tasks can exchange collective communication meta data, such as data type description, message size, buffer address, etc. and can be used to deliver event notifications, such as the completion of data transfer.

For a communicator whose tasks are running on multiple operating system images (OSIs), the MPI collective communication is an integration of the concurrent cross-memory attach optimization and the traditional inter-node collective communication. One aspect of the invention exploits a model in which tasks running on a single OSI are represented by a single task (e.g., a node leader) on that OSI to participate in the inter-node collective communication. A collective communication may involve a possible intra-node prologue, inter-node communication and a possible intra-node epilogue. In the possible prologue or epilogue phase, data are gathered/scattered to/from the node leader from/to other tasks on the operating system image, using the concurrent cross-memory attach optimization described herein. In the inter-node communication phase, node leaders perform inter-node communication, each on behalf of the tasks on its own OSI. For example, in a broadcast operation, in the inter-node stage, the root broadcasts the data to node leader tasks on the other nodes using a traditional tree algorithm based on point-to-point MPI_Sends/MPI_Recvs. When the leaders receive the data, the leaders transfer the data to other intra-node tasks using the concurrent multiple attach facility of the present invention.

Although various collective communications are described above, many other collective communications can benefit from one or more aspects of the present invention, including, but not limited to, gatherv and scatterv, reduce, allreduce and reduce/scatter, as examples. Moreover, although MPI is described herein, other message passing protocols may benefit from one or more aspects of the present invention.

Further, although in the examples above, multiple importing tasks concurrently attach a memory object of an exporting task, in other embodiments, there may be multiple exporters and/or multiple memory objects to be attached.

Yet further, the communications environment described herein is only one example. Many other environments may benefit from one or more aspects of the present invention. As one example, nodes other than RS/6000s and/or operating systems, other than AIX and Linux, may be used. Many other variations exist without departing from the spirit of the present invention.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of sharing data between tasks of a collective communications environment, said method comprising:

coupling a set of data source tasks with a set of data sink tasks, wherein at least one of the set of data source tasks and the set of data sink tasks comprises a plurality of tasks, and wherein the coupling comprises at least one of:

allowing at least a portion of a data memory address space of one data source task of the set of data source tasks to be concurrently attached by multiple data sink tasks of the set of data sink tasks via modification of existing address spaces of the multiple data sink tasks, the at least a portion of the data memory address space of the one data source task comprising one of a send buffer application data structure or a receive buffer application data structure belonging to the one data source task, and wherein the modification comprises each data sink task of the multiple data sink tasks concurrently attaching the at least a portion of data memory address space of the one data source task, including the send buffer application data structure or the receive buffer application data structure thereof, to its own address space; or allowing at least a portion of a data memory address space of one data sink task of the set of data sink tasks to be concurrently attached by multiple data source tasks of the set of data source tasks via modification of existing address spaces of the multiple data source tasks, the at least a portion of the data memory address space of the one data sink task comprising one of a send buffer application data structure or a receive buffer application data structure belonging to the one data sink task, and wherein the modification comprises each data source task of the multiple data source tasks concurrently attaching the at least a portion of data memory address space of the one data sink task, including the send buffer application data structure or the receive buffer application data structure thereof, to its own address space; and transferring data between the set of data source tasks and the set of data sink tasks absent a copying of the data to/from shared memory, and wherein the transferring comprises directly transferring the data via one of the concurrently attached at least a portion of data memory address space of the one data source task or the concurrently attached at least a portion of data memory address space of the one data sink task.

2. The method of claim 1, wherein the allowing the at least a portion of the data memory address space of the one data source task or the one data sink task to be concurrently attached comprises:

registering, with an operating system of the collective communications environment, the send buffer application data structure or the receive buffer application data structure belonging to the one data source task or the one data sink task as a memory object; and attaching, by the multiple data sink tasks or the multiple data source tasks, respectively, the memory object to multiple address spaces of the multiple data sink tasks or the multiple data source tasks through concurrent addressability.

3. The method of claim 2, wherein the attaching by a task of the multiple data sink tasks or the multiple data source tasks comprises attaching a portion of the memory object to be made visible to the task to an address space of the task, and wherein a portion of the memory object is not attached to the task.

4. The method of claim 2, wherein the attaching comprises, for the one data source task or the one data sink task, using information stored in a control structure accessible by the multiple data sink tasks or the multiple data source tasks, respectively, to attach the memory object, said information being associated with the registering.

5. The method of claim 2, wherein the transferring data comprises copying data from the registered application data structure to multiple application data structures of multiple address spaces.

6. The method of claim 5, wherein the copying from the registered application data structure to an application data structure of the multiple application data structures comprises copying from a specific location within the registered application data structure to the application data structure.

7. The method of claim 5, wherein the registered application data structure and the multiple application data structures comprise at least one discontiguous data structure, and wherein said copying comprises redistributing the data to the registered application data structure.

8. The method of claim 2, wherein the providing data comprises copying data from multiple application data structures of the multiple address spaces to the registered application data structure.

9. The method of claim 8, wherein the copying from an application data structure of the multiple application data structures comprises copying the data from the application data structure of the multiple application data structures to a specific location within the registered application data structure.

10. The method of claim 8, wherein the registered application data structure and the multiple application data structures comprise at least one discontiguous data structure, and wherein said copying comprises redistributing the data to the registered application data structure.

11. The method of claim 2, further comprising detaching by at least one task of the multiple data sink tasks or the multiple data source tasks the registered application data structure from at least one address space of the at least one task.

12. The method of claim 2, further comprising unregistering the registered application data structure.

13. The method of claim 1, wherein the coupling is performed only as required by a need to share data.

14. The method of claim 1, wherein the set of data source tasks and the set of data sink tasks are of an application executing within a node of the communications environment.

15. The method of claim 1, wherein the transferring data comprises copying data from one or more application data structures of the set of data source tasks to one or more application data structures of the set of data sink tasks.

16. The method of claim 1, wherein the allowing at least a portion of a data memory address space of one data source task or the allowing at least a portion of a data memory address space of one data sink task comprises determining on an as-needed basis that a concurrent multiple attach facility is to be used in transferring data between the set of data source tasks and the set of data sink tasks, and performing the transferring in response to the determining.

17. The method of claim 16, wherein the determining comprises considering one or more factors, said one or more factors comprising a size of the data to be transferred.

\* \* \* \* \*